(12) United States Patent
Chatufale

(10) Patent No.: US 6,279,875 B1
(45) Date of Patent: Aug. 28, 2001

(54) GATE VALVE WITH IMPROVED TELESCOPING SEAT ASSEMBLY

(76) Inventor: Vijay R. Chatufale, 10950 W. Brae Pky. #2112, Houston, TX (US) 77031

( * ) Notice: Subject to any disclaimer, the term of this patent is extended or adjusted under 35 U.S.C. 154(b) by 0 days.

(21) Appl. No.: 09/477,215

(22) Filed: Jan. 4, 2000

(51) Int. Cl.$^7$ ...................................................... F16K 3/16
(52) U.S. Cl. ..................... 251/174; 251/171; 251/172; 251/328
(58) Field of Search .................................. 251/171, 172, 251/174, 328

(56) References Cited

U.S. PATENT DOCUMENTS

| | | | |
|---|---|---|---|
| 3,667,727 | * 6/1972 | Bowden | 251/172 X |
| 4,741,509 | 5/1988 | Bunch . | |
| 4,878,651 | 11/1989 | Meyer . | |
| 5,201,872 | 4/1993 | Dyer . | |
| 5,445,359 | * 8/1995 | Beson | 251/172 X |
| 5,533,738 | * 7/1996 | Hoffmann | 251/172 X |
| 6,082,707 | * 7/2000 | Hosie et al. | 251/172 |

* cited by examiner

Primary Examiner—Kevin Lee
(74) Attorney, Agent, or Firm—Kenneth L. Nash

(57) ABSTRACT

A gate valve is disclosed having a telescopingly interfitted seat assembly that fits into a recess in a gate chamber between the gate valve body and the gate. A sealing cavity is formed between two seat elements that form the telescopic connection. A preferably unidirectional seal is disposed therein having two lip seals. The unidirectional seal is preferably oriented to allow leakage for a pressure differential wherein the gate chamber has a higher pressure than the pressure on the opposite side of the seal from the gate chamber. The seal is preferably made of non-permeable material and the material is preferably flexible but non-elastic with little or no memory. Additional such seals may be used for sealing with the gate valve body. In one embodiment, an expansion member is provided for extending into an open end of the seal to expand the two lip seals. An additional bi-directional seal may be provided that is sized to allow leakage when the two seat elements are expanded and to seal when a preferably floating gate compresses one of the telescoping sets seat elements.

36 Claims, 3 Drawing Sheets

GATE VALVE WITH IMPROVED TELESCOPING SEAT ASSEMBLY

BACKGROUND OF THE INVENTION

1. Field of the Invention

The present invention relates generally to gate valves and, more particularly, to apparatus and methods for a telescoping seat assembly with a uniquely operating seal arrangement.

2. Description of the Background

Telescoping seat assemblies have been known for use in gate valves for some time. One advantage of this type of seat assembly is the ability to provide a force on the seats and valve body that varies due to pressures encountered. In this way, one is assured of a good seal with a wide range of pressures. Another advantage is that friction due to movement of the gate may be kept at a minimum because the sealing force exerted by the seat assemblies may be automatically adjusted only as necessary to securely maintain a gas tight seal. Pressure lock conditions in telescoping seat assemblies have been solved in the past by varying the area of seal faces as discussed in at least one of the subsequent patents. However, it would be desirable to provide alternate or additional means for eliminating pressure lock. In addition or alternatively, it would be desirable to improve sealing over wider pressure, fluid type, and temperature ranges.

O-ring seals which use elastomeric material have the advantage of being easy to effect with loose tolerances. However, when a device may be used in a wide range of temperatures, fluids, and pressures, it becomes highly difficult to ascertain that the proper O-ring will be used. Numerous O-rings exist each with different fluid tolerances, pressure ranges, and temperature ranges. The charts which have all these effects are pages long and one must know the fluids, pressures, and temperatures for the application to select the correct O-ring. O-rings are also subject to the phenomena of explosive decompression when high pressures are suddenly reduced due to expansion of gas that has permeated into the O-ring. Thus, it becomes highly probable that in some cases depending on the fluid, pressure, and temperature the wrong O-rings will be used and the valve will leak.

Unidirectional seals made of non-elastomeric and non-permeable materials have been known that will operate under much wider ranges of temperatures, fluids, and pressures. However, such seals do not easily form a seal as do O-rings. The tolerances must be much tighter and the surfaces cannot tolerate imperfections. For this and related reasons, their use has been greatly limited. For the same reason, TEFLON based seals are not widely used even though they are inert to virtually any fluid. They cannot simply replace an O-ring.

An exemplary type of telescoping valve seat assembly gate valve is shown in U.S. Pat. No. 4,878,651, issued Nov. 7, 1989, to F. W. Meyer, Jr., which is incorporated herein by reference, as a through conduit gate valve apparatus with a valve seat assembly that is field maintainable and which prevents the occurrence of pressure lock. Each valve seat assembly includes a retainer ring fixed in the valve body and a pressure responsive seat ring that seals with the gate member. The seat ring is responsive to fluid pressure in the valve flow passageways for maintaining and enhancing the face seal with the gate and simultaneously to fluid pressure in the valve chamber for automatically venting the valve chamber to prevent occurrence of a pressure lock condition.

Another telescoping valve seat assembly gate valve is shown in U.S. Pat. No. 5,201,872, issued Apr. 13, 1993, to M. L. Dyer, which is also incorporated herein by reference, that discloses a gate valve wherein bore pressure in the body cavity of the valve is isolated in the open and closed position. In the closed position, a double metal sealing barrier is provided across the gate. In the open position, the pressure is isolated from the stem packing and bonnet gasket by the seats on either side of the gate. Formation of hydrates in the body cavity is eliminated, and better retention of body grease is achieved during flow through the valves. Metal-to-metal seal surfaces are developed, thereby eliminating wear on the non-metal components and reducing torque requirements.

U.S. Pat. No. 4,741,509, issued May 3, 1988, to Bunch et al., discloses a gate valve with a body having a valve member and gate chamber, passages communicating through the body into the chamber, a recess in the body surrounding the opening of each passage into the chamber, a bushing positioned in each recess, a gate positioned within the chamber, means for moving the gate within the chamber between positions communicating flow between the passages and closing flow between the passages, inner and outer unidirectional seals positioned between the surface of each recess facing the gate and the opposing surface of the bushing in the recess; each seal includes a U-shaped lip sealing element and a U-shaped spring positioned within the lip sealing element and urging the legs of the element apart into sealing engagement between the bushing and the body; the inner seal, which is positioned closest to the passage, has the open end of its sealing element facing the passage; and the outer seal, which is farther from the passage than the inner seal, has the open end of its sealing facing away from the passage; each seal and the body that has a depth less than the height of the seal while it is still in an effective sealing condition, the seals being compressible in height so that their bushings engage the body recess in a metal-to-metal seal when they are loaded and recoverable from such compressed position to provide a tight seal when said loading is relieved.

Thus, in some cases, it would be desirable to provide for the possibility of another method of venting excess pressure in the bonnet in a manner not shown by the prior art. As well, it would be desirable to provide for increased or wider range of pressure, fluid, and temperature operating conditions for a gate valves generally. In another application, it would be desirable if the downstream seat assembly were constructed to provide a backup seal if the upstream seat assembly were to fail. Those skilled in the art have long sought and will appreciate the present invention which addresses these and other problems.

SUMMARY OF THE INVENTION

A gate valve comprising a gate valve body has a gate chamber therein with inlet and outlet passages extending through the gate valve body and in communication with the gate chamber to define a flow path through the gate valve body. The gate valve body has a recess surrounding the inlet and outlet passages adjacent to the gate chamber. A telescoping seat assembly is positioned in each recess, with each telescoping seat assembly including a first seat element which has a receptacle surface therein. Each seat assembly also includes a second seat element that has an outer surface. The outer surface is telescopingly received within the receptacle surface of the first seat element such that the first seat element and the second seat element are each moveable in substantially an axial direction with respect to the flow path. The first seat element and the second seat element define therebetween a seal cavity between the receptacle surface and the outer surface. A spring biased seal element is disposed in the seal cavity and comprises non-elastic and non-permeable material with little or no memory. A gate is positioned within the gate chamber. The gate is moveable within the gate chamber between an open position, to allow fluid flow through the flow path, and a closed position, to prevent fluid flow through the flow path. Preferably, the gate is a floating gate.

The spring-biased seal element is a unidirectional seal element oriented such that a differential pressure across the unidirectional seal, with a higher pressure of the differential pressure in the gate chamber as compared to a lower pressure at the open end of the unidirectional seal, will cause leakage across the unidirectional valve if the differential pressure is large enough to overcome the bias force of the spring loaded seal element. The seal element preferably comprises two lip seals biased in opposing directions by the spring. The unidirectional seal element has an open end and a closed end so that the open end has the spring loaded lip seal surfaces for sealing between the first seat element and the second seat element. The unidirectional seal is substantially U-shaped as is intended to include winged shapes including V-shaped construction. The open end of the seal element is distal to the gate chamber in the flow path between the first seat element and the second seat element. The lip seals comprise a non-permeable material.

A spreader block may be used with the unidirectional seal to provide additional urging of the seal elements into engagement with sealing surfaces. An anti-extrusion seal may be used adjacent the V-shaped seal to prevent extrusion through a gap.

It is an object of the present invention to provide an improved seat assembly for a gate valve.

It is another object of the present invention to provide a seat assembly that includes a unidirectional seal element.

It is yet another object of the present invention to provide a seat assembly that operates at higher temperatures and pressures.

It is yet another object of the present invention to provide a seating assembly that will provide a backup downstream seal in case the primary upstream seal fails.

A feature of the present invention is a U-shaped seal oriented horizontally with respect to flow through a gate valve and disposed within a seat assembly.

An advantage is an improvement over the disadvantages of elastomer seals with respect to limitations as to fluids, pressures, and temperatures.

These and other objects, features, and advantages of the present invention will become apparent from the drawings, the descriptions given herein, and the appended claims.

While the present invention will be described in connection with presently preferred embodiments, it will be understood that it is not intended that the invention is limited to those particular embodiments, but the descriptions given herein are merely to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims are encompassed as a part of the present invention.

DETAILED DESCRIPTION OF THE PREFERRED EMBODIMENTS

Figure 1:
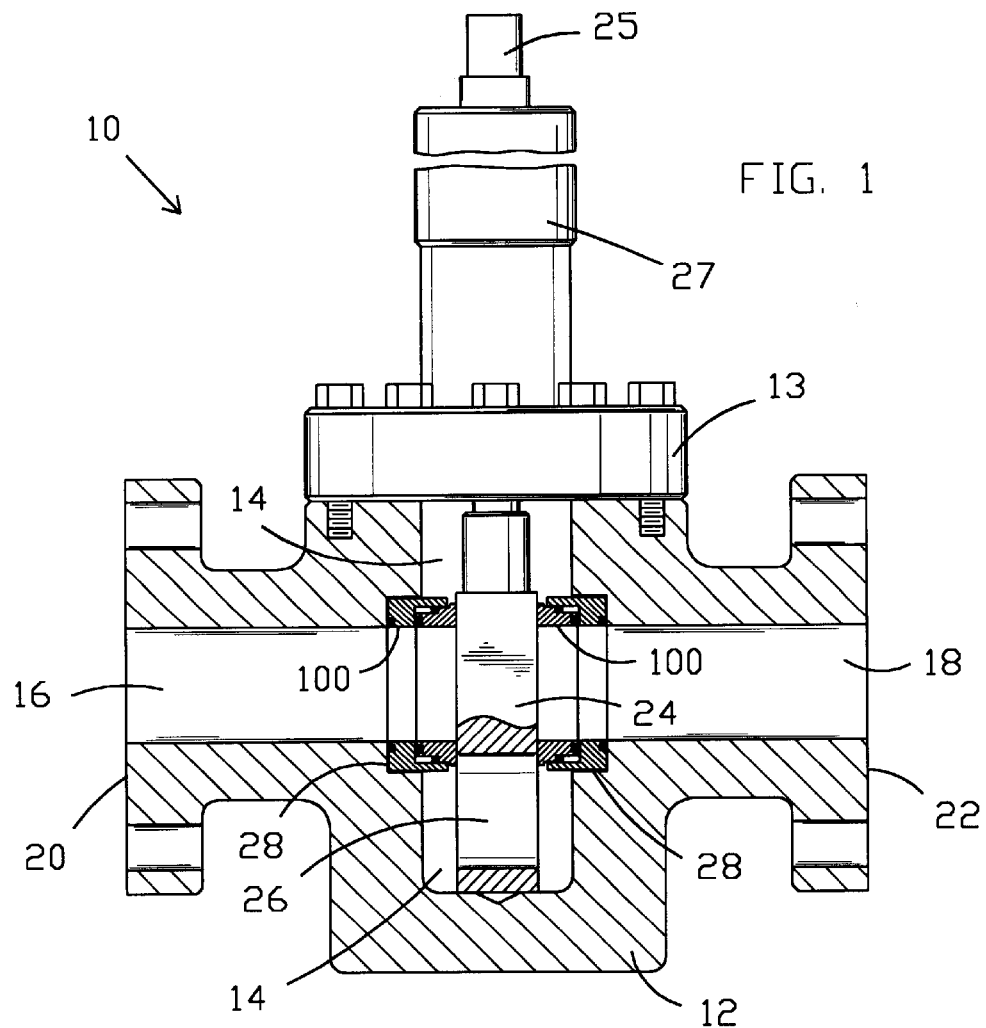
FIG. 1 is an elevational view, partially in section, of a gate valve in accord with the present invention.

In one embodiment of the present invention, an objective is successfully reached for providing a gate valve operable to control a wider range of fluids at wider ranges of temperature and pressure. The gate valve of the present invention also discloses one or more apparatus and methods by which a secondary seal can be provided if a primary seal fails. As well, the gate valve of the present invention may be designed so that pressure lock may be eliminated in one or more ways. Referring now to the drawing, and more particularly to FIG. 1, where a preferred embodiment of gate valve 10, in accord with the present invention, is illustrated. Gate valve 10 uses two preferably mirror image sets of telescoping seat elements, such as seat elements 100, that have many advantages for operation with a gate valve as discussed hereinafter. While the seat elements are mirror image sets, the operation of the seat elements in upstream environment may vary from operation in a downstream environment.

Gate valve 10 includes a valve body 12 with a removable bonnet or cap portion 13 that provides access to body cavity or chamber 14 which is formed within valve body 12 and contains the working gate valve components. Valve body 12 defines flow passageways 16 and 18 which are preferably aligned on a common axis and preferably form a straight through flow path in which fluid flow is controlled. Depending on design, passageways 16 and 18 are typically designated as upstream and downstream passageways and may require connection in this manner. In a preferred embodiment of the invention, seating elements 100 are mirror images of each other and gate valve 10 may be mounted with either passageway 16 or 18 as the upstream passageway. Together flow passageways 16 and 18 form a passageway for fluid to flow through gate valve 10. Flanges 20 and 22 may be used to connect gate valve 10 in position with the line to be controlled, although other means can be used for this purpose. Gate valve 10 may be used to control a line with fluids under pressure such as gas, oil, chemicals, mixtures, flurries, and the like, as desired.

Within chamber 14 is gate 24 that moves transversely and preferably at a right angle with respect to the axis of flow passageways 16 and 18 to thereby open and close gate valve 10. Preferably gate 24 is mounted to be a floating gate thereby allowing some, typically very slight, axial movement of gate 24 with respect to the flow passageways. The axial movement of the gate valve may be used to assist downstream sealing as discussed with respect to subsequently disclosed embodiments of the present invention. Gate 24 is shown in the closed position in FIG. 1. To open gate valve 10, gate 24 moves upwardly and laterally with respect to flow passageways 16 and 18 so that gate passageway 26 is lined up with flow passageways 16 and 18. Thus in one presently preferred embodiment, when gate 24 is in a downward position as shown in FIG. 1, the valve is closed. When gate 24 is in an upward position, the valve is open. It will be understood that the terms "upper," "lower," and the like, refer to the figures and are used for convenience only and that the same components or portions of them may be oriented in different ways in operation, storage, manufacturing, and so forth as known by those skilled in the art. The outer surfaces on gate 24 are preferably polished for sealing purposes as is known to those of skill in the art. Gate 24 is typically operated by some means such as rotation of valve stem 25 by a handle or operator (not shown). Valve stem 25 rotates within upper housing 27 to thereby reciprocate gate 24 upwardly and downwardly. Other means or general control arrangements for operating gate 24 are known to those of skill in the art.

Valve body 12 has formed therein enlarged pockets or recesses 28 that mate with seat elements 100 at the juncture of passageways 16 and 18 and gate chamber 14. Valve seats 100 operate within pockets or recesses 28 along with gate 24 to form a seal thereby preventing flow through gate valve 12 when gate 24 is closed. In one preferred embodiment, a metal-to-metal seal between gate 24 and valve seat assemblies 100 is formed as is known to those of skill in the art. The seal between seat assemblies 100 and pockets 28 may be of various types and include multiple seals including metal-to-metal and other types of seals as discussed hereinafter.

Figure 2:
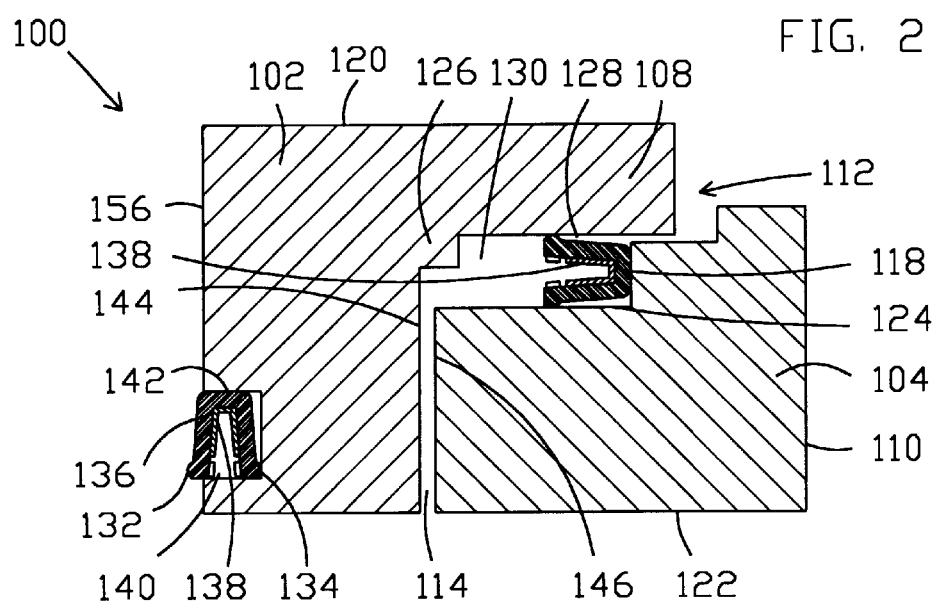
FIG. 2 is an enlarged elevational view, in section, of a portion of a seat assembly with a unidirectional seal element mounted therebetween in accord with the present invention.

FIG. 2 discloses one preferred embodiment of seat assembly 100 in accord with the present invention. The pair of seat assemblies 100 are mirror images of each other so that only one seat assembly is shown for discussion purposes and it will be understood that the other seat assembly is typically substantially the same, except for being a mirror image. The upstream and downstream operation mirror image seat assemblies 100 may vary as discussed subsequently.

It will be understood that the components are shown in substantially conceptual form for ease of explanation and are not intended to represent manufacturing dimensions, sizes, or details. In fact, the dimensions may be exaggerated to more clearly show the features of discussion. Seating assembly 100 surrounds passageways 16 and 18 and is preferably circular in construction and mounts into a respective preferably cylindrical pocket or recess 28.

First seat element 102 and second seat element 104 are preferably telescopically interconnected such that second seat element 104 is sized to fit within first seat element 102 within inner surface 128 of extension 108. It will be noted that although the seating elements are preferably telescoping with each other, first seat element 102 could be made to fit within second seat element 104, if wanted. Thus, there are no particular conceptual restraints on which seat element goes telescopingly inside the other but in the presently preferred embodiment, the seating arrangement is as shown.

Surface 110 preferably seals with gate 24 with a metal-to-metal seal. Surface 110 may have various indentations or a designated surface area that may be larger or smaller than other surface areas of the seating elements to effect a variable force acting against the gate so that the sealing force that pushes surface 110 against gate 24 is greater than the force that would urge the two surfaces apart.

Passageway 114 is defined between first seat element 102 and second seat element 104 and extends between gate chamber 14 and inlet and outlet passageways 16 and 18. Gate chamber 14 pressure is available along the top of seat assembly 100, as shown in FIG. 2, and may enter at 112 into passageway 114 that includes seal cavity 130 between first seat element 102 and second seat element 104. As well, pressure from the valve passageways 16 and/or 18 may enter into passageway 114 as indicated. It will be understood that gate chamber 14 pressure acts along upper surfaces 120 of seat assembly 100 and line pressure acts along lower surfaces 122. Seal element 118 is mounted between first seat element 102 and second seat element 104 within seal cavity 130 defined by surface 124 of element 104 and surface 128 of seat element 102. Thus, a differential pressure may typically exist across seal 118. Seal 118 is designed to seal and to control fluid flow in passageway 114 in a unique way.

Seal cavity 130 is part of passageway 114 and seal element 118 is positioned to isolate gate chamber 14 pressure from input/output 16 and 18 line pressure when line is greater than gate chamber 14 pressure. Shoulder 126 may be provided to limit axial movement of seal element 118, if desired. Shoulder 126 may be wider to further limit axial movement of seal element 118 or could be removed. Thus, seal element 118 may be initially mounted on either of first seat element 102 or second seat element 104 for assembly purposes. O-ring grooves may not be suitable for unidirectional seals when oriented as seal element 118 is oriented. The preferred form of seal element 118 is inelastic and so cannot be stretched or positioned into an O-ring groove. Thus, different means such as seal cavity 130 have to be provided for mounting the presently preferred type of unidirectional seal.

A preferred unidirectional seal element 118 has two oppositely directed lip seals 132 and 134 as is shown most conveniently on seal element 136. Seal element 136 is preferably of the same general seal construction as seal element 118 in this embodiment. Lip seals 132 and 134 preferably have a rounded surface so as to make a point contact seal. Thus, seal element 118 preferably makes a point contact seal with surface 128 and surface 124 so as to effect sealing therebetween. Seal element 136 and 118 include bias spring 138 that biases lip seals 132 and 134 in opposite directions with respect to each other. A preferred unidirectional seal is generally U-shaped which description is also intended to describe winged or V-shaped seals that have an open end 140 and an opposite closed end 142, as indicated on seal element 136.

Therefore seal element 118 is mounted so that it may be moveable axially to a certain degree as determined by the size of seal cavity 130. For some applications, seal element 118 may be used to vent pressure from valve chamber 14 into passageways 16 and 18 if the valve chamber pressure is higher than line pressure. It will be seen that if a differential pressure exists across seal element 118 such that the closed end is at a higher pressure than the open end; then leakage will occur if the differential pressure is great enough to overcome the bias force of the spring that biases the two lip seals apart.

Other means for venting pressure are discussed in U.S. Pat. No. 4,878,651 that may or may not be used in connection with this feature. As well, additional seal elements such as metal-to-metal seats, metal or non-metal seal rings, or additional seals such as seal element 118, as discussed subsequently, may be used along surfaces 144 and 146 that defines passageway 114 between first seat element 102 and second seat element 104.

If a pressure differential across seal element 118 is directed so that the pressure at the open end is greater than the pressure at the closed end, then the pressure forces the two opposing lip seals against the sealing surfaces 124 and 128 to enhance sealing. The spring pressure provided by spring 138 establishes an initial seal.

It is undesirable for lip seals 132 and 134 of seal elements 136 and 118 to be comprised of an elastomeric or permeable material such as is used in O-rings because that will tend to limit the pressure range and temperature operating range of gate valve 10. The material of the lip seals is preferably a polymer or thermoplastic that has little or no memory, although conceivably a soft metal material might also be used. In other words, the lips seals should be comprised of a material that is substantially non-elastic but is sufficiently pliable or flexible enough to act as a good seal material by conforming to sealing surfaces 124 and 128. The selected material should also be non-permeable so as to avoid the problem that many O-rings have of absorbing gasses under pressure and subsequently expanding or exploding when the pressure is released. The material should also have a high temperature rating and be resistant to caustic and acidic fluids and other fluids such as those found in oil and gas wells or pipelines. Various materials are available for this purpose including polymers, thermoplastics, PEEK(polyetheretherketone), PES (polyethersulfone), PTFE (polytetrafluroroetheylene), and the like.

Seal member 136 is a unidirectional seal element and may be used for sealing between seat element 102 and valve body pocket or recess 28. Additional seals including metal-to-metal seals, unidirectional seals, and the like but preferably not elastic O-ring seals may also be used in place of or in conjunction with seal 136 as discussed below along pocket seal surface 156 of seat element 102. Seal 136 is transversely oriented as compared with seal element 118.

Figure 3:
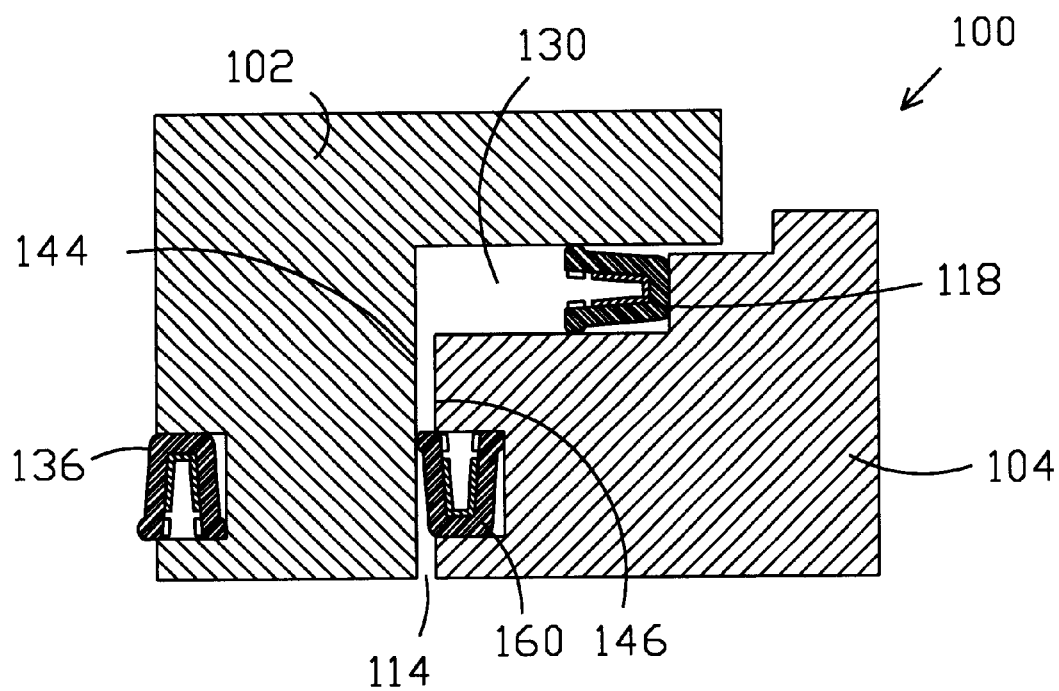
FIG. 3 is an enlarged elevational view, in section, of a portion of a seat assembly with an additional transversely oriented seal element therebetween and an externally positioned, unidirectional seat assembly seal element in accord with the present invention.

Referring to FIG. 3 an additional unidirectional seal element 160 is shown mounted within passageway 114. For mounting purposes, a groove is provided in surface 146 into which seal element 160 may be positioned. It will be noted that seal element 160 is aligned transversely, at a right angle, or orthogonally with respect to seal element 118. As well, the open end of seal 160 is directed to prevent leakage between gate chamber 14 and inlets or outlets 16 and 18. Thus, this design might be useful for a backup seat assembly to maintain a seal when the valve is closed. In such a case, if the line pressure which may be at inlet 16 leaks through the upstream or primary seal that would include seal 118 to gate chamber 14, the line pressure at inlet 16 would be prevented from reaching outlet 18 through passageway 14 due to seal element 160.

Therefore, the design of FIG. 3 operates in a somewhat different way than does the design of FIG. 2. In the design of FIG. 2, it might be desirable to have leakage from gate chamber 14 to the line under certain conditions but not under others. For instance, the design of FIG. 2 would allow assembly 100 to seal as a backup to a primary seal 100 due to a metal-to-metal seal along 144 and 146 that might be effected, for instance, by pressure exerted on floating gate 24 at the primary seal that would provide sufficient activation force due to axial movement of floating gate 24 for a metal-to-metal seal. On the other hand, when gate 24 does not activate the metal-to-metal seal, leakage could occur to thereby remove a pressure differential between gate chamber 14 and inlet/outlet 16 and 18 such that the gate chamber 14 pressure is greater than the line pressure as might occur if the line pressure drops. For example when valve 10 is closed, inlet 16 is upstream and is adjacent the primary seal, line pressure at inlet 16 drops thereby allowing flow past seal 118 to inlet 16.

Figure 4:
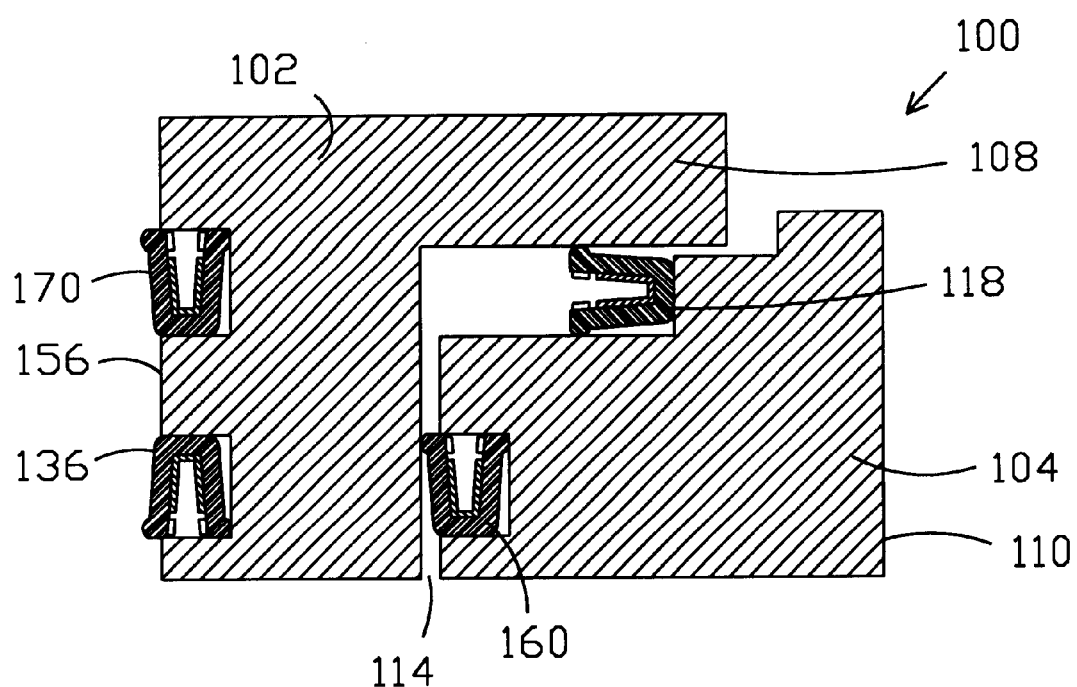
FIG. 4 is an enlarged elevational view, in section, of a portion of a seat assembly with an additional transversely oriented seal element therebetween and two externally positioned oppositely oriented unidirectional seat assembly seal elements in accord with the present invention.

FIG. 4 shows yet another embodiment of the present invention wherein the concept of FIG. 3 is combined with additional seal 170 to provide sealing at recess 28. This design conveniently allows for use of essentially the same type of unidirectional seal in four different locations in each seal assembly 100. Such seals may also be used in conjunction with metal-to-metal seals such as along surface 110, along passageway 114, or along surface 156.

In operation, pressure from the line will enter into passageway 114 and act along the surfaces of passageway 114 to produce a force that creates a metal-to-metal seal at the gate along surface 110. Seal 136 and/or other seals such as metallic rings, additional seals such as seal 170 as discussed hereinbefore, or metal-to-metal seals are used to seal with the valve pocket along surface 156. As discussed previously, seal element 118 seals between seat elements 102 and 104. For the case where the valve is closed, and the upstream seating elements leak, the downstream seating elements are preferably designed to provide a backup seal. In this case, line pressure might be in upstream passageway 16 and a reduced or lower pressure may be in downstream passageway 18. If the upstream seating elements 100 leak, then the line pressure would also enter chamber 14. Although differential pressure would tend to allow leakage across downstream seating elements including seat element 118, it would be desirable to have an additional seal along passageway 114 that would be activated, at a minimum, by pressure acting on gate 24 which, as stated previously, is preferably floating to permit some axial movement. The substantially large surface area of gate 24 produces a significant force along surfaces 114 so as to produce a seal therein to activate the particular type of seal therein as necessary. As well, one or more seals would act to seal between the downstream valve pocket 28 and the downstream seat element 102 within the downstream valve pocket.

Figure 5:
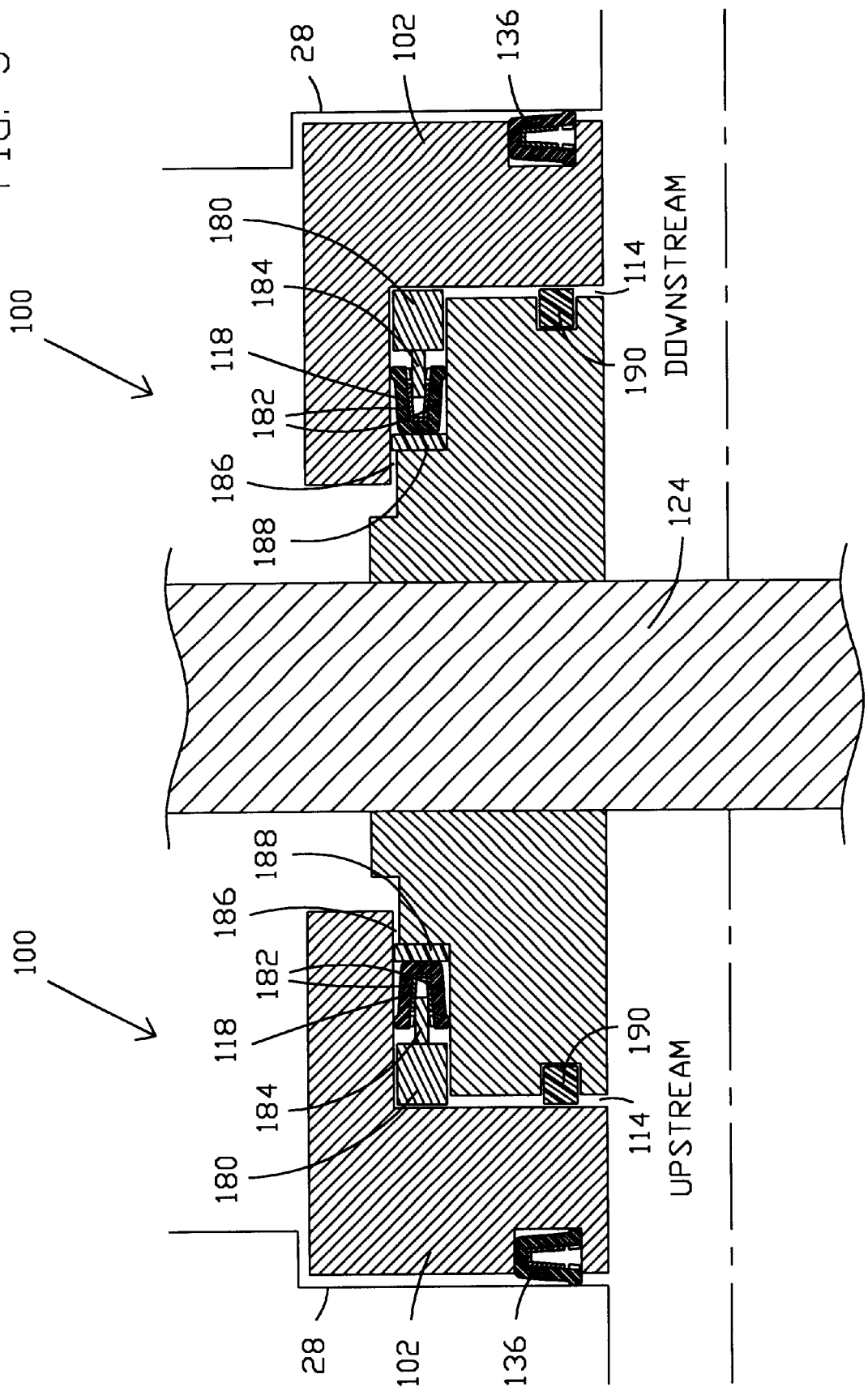
FIG. 5 is an enlarged elevational view, in section, of a portion of a seat assembly with spreader blocks for use with unidirectional seat elements in accord with the present invention.

FIG. 5 discloses a presently preferred embodiment of the present invention wherein both the upstream and downstream mirror image assemblies are included to aid in understanding of operation. The embodiment of FIG. 5 includes U-shaped seal elements 118 and 136 as discussed previously. Other elements are added to facilitate operation. Spreader rings 180 are used to ensure expansion of legs or wings 182 of U-shaped elements 118 to thereby more positively ensure sealing, especially initial sealing, and avoid leaking. Spreader rings 180 include spread shaft 184 that engages and expands wings 182. Shaft 184 may have beveled, curved, or sloping sides for engagement with the inner surfaces of seal elements 118, as desired. While not the presently preferred embodiment, spring loading could be used for engaging spring 180 with wings 182.

Due to the telescoping nature of seating elements 100, a gap 186 is present that, under high pressure conditions, might cause extrusion damage to seals 118. Therefore, an anti-extrusion ring 188 is preferably provided for each seal 118 to remove this possibility. Anti-extrusion ring 188 is preferably a non-metallic material such as PEEK or other such material as discussed above. A seal ring element 190 is provided in passageway 114 that, although an upstream/downstream mirror image, will operate differently depending on conditions such as valve open or closed and whether placed at the upstream or downstream. Seal ring element 190 may be comprised of a non-metallic material suitable for high temperature operation, such as TEFLON. As discussed above, the mirror image arrangement allows either end of valve 10 to be used as the input or output.

Assuming valve 10 is closed and the upstream pressure is higher than downstream pressure, upstream or primary seal elements 100 normally provide a gas tight seal over a wide temperature operating range. Upstream high temperature seal 136 prevents leakage past element 102. Pressure in upstream passageway 114 forces element 102 into engagement with pocket 28 to enhance sealing of seal 136. Likewise, pressure in 114 forces element 104 of the upstream seal against valve element 124. Upstream seal element 118 normally prevents flow through element 102 and 104. Element 190 normally allows some leakage in the upstream seal assembly. This leakage allows excessive pressure to flow through 114 if line pressure drops to prevent pressure lock. This leakage also allows line pressure along the length of passageway 114 to produce more sealing force acting on element 102 and 104 towards pocket 28 and gate 124, respectively.

To understand the backup functioning of valve 10 assume that for some reason, the primary seal fails so as to leak. The higher pressure of the upstream as compared to the downstream has moved floating gate element 124 axially towards downstream. The axial movement of gate 124 causes seal 190 to be compressed and seals off downstream passageway 114. Thus, even though pressure might otherwise flow past downstream element 118 due to a higher pressure at its closed end, activation of seal 190 prevents such flow. Likewise, even though pressure might otherwise flow past downstream seal 136 at downstream pocket 28, compression of downstream element 102 against downstream pocket 28, further activates seal 136 to prevent leakage. Other seal elements could also be used between pocket 28 and element 102 such as metal seals, additional U-shaped seals such as seal 170 shown in FIG. 4 and the like. However, it has been found that additional seals between pocket 28 and element 102 have not been necessary due to the axial movement of gate 124 that further compressively activates seal 136. The metal-to-metal seal with the gate valve is also activated in this manner. Thus, valve 10 is designed to have a highly reliable primary seal but also includes a backup secondary seal so as to make valve 10 extremely reliable.

As in the above embodiments, when valve 10 is open both the upstream and downstream assemblies operate in the same manner whereby the elements telescope away from each other to seal against the pocket and gate. The passageway 114 is sealed off by element 118 as additionally activated by spreader ring 180.

In summary, the present invention has numerous valuable advantages including extended temperature and pressure applications as well as the possibility to provide venting between the valve chamber and the line, and also the possibility of providing a downstream backup seal in case the primary upstream seal fails. In other words, the present invention results in a highly reliable valve under a wide range of operating conditions and pressures.

There are also numerous additional embodiments. For instance, seal 118 and/or seal 160 might be oriented in the opposite direction to effect various goals. Likewise seal 136 and/or seal 170 might be oriented in the opposite direction. The expander 180 is a very unique element that has been found to improve sealing operation of unidirectional seals. As such, the combination of an expander and unidirectional seal may be used in other valve, with other seat arrangements, and so forth.

The foregoing disclosure and description of the invention is illustrative and explanatory thereof, and it will appreciated by those skilled in the art, that various changes in the size, shape and materials as well as in the details of the illustrated construction or combinations of features of the various actuator elements may be made without departing from the spirit of the invention.

What is claimed is:

1. A gate valve comprising:
   a gate valve body having a gate chamber therein, inlet and outlet passages extending through said gate valve body and being in communication with said gate chamber to define a flow path through said gate valve body, said gate valve body having a recess surrounding said inlet and outlet passages adjacent to said gate chamber;
   a telescoping seat assembly in each of said recesses, each said telescoping seat assembly including,
   a first seat element defining a receptacle surface therein;
   a second seat element defining an outer surface, said outer surface being telescopingly received within said receptacle surface of said first seat element such that said first seat element and said second seat element are each moveable in an axial direction with respect to said flow path;
   said first seat element and said second seat element defining therebetween a seal cavity between said receptacle surface and said outer surface; and
   a unidirectional seal element disposed in said seal cavity, said unidirectional seal element having an open end and a closed end, said open end having lip seal surfaces for sealing between said first seat element and said second seat element; and
   a gate positioned within said gate chamber, said gate being moveable within said gate chamber between an open position to allow fluid flow through said flow path and a closed position to prevent fluid flow through said flow path.

2. The gate valve of claim 1, wherein:
   said gate is a floating gate.

3. The gate valve of claim 1, further comprising:
   springs for spring loading said lip seal surfaces so as to provide a bias force, said unidirectional seal is oriented such that a differential pressure across said unidirectional seal with a higher pressure of said differential pressure in said gate chamber as compared to a lower pressure at said open end of said unidirectional seal will cause leakage across said unidirectional valve if said differential pressure is large enough to overcome said bias force of said spring loaded lip seal surfaces.

4. The gate valve of claim 1, further comprising:
   said lip seals being comprised of a non-permeable material.

5. The gate valve of claim 1, further comprising:
   said unidirectional seal being substantially U-shaped.

6. The gate valve of claim 1, further comprising:
   a coating surrounding said unidirectional seal element, said coating being comprised of a flexible material having no memory.

7. The gate valve of claim 1, further comprising:
   a unidirectional gate valve body seal for each of said telescoping seat assemblies, said unidirectional gate valve body seal being disposed between each said telescoping seat assembly and a corresponding of each of said recesses.

8. The gate valve of claim 1, further comprising:
   an anti-extrusion ring adjacent said closed end of said unidirectional seal element.

9. The gate valve of claim 1, further comprising:
   a spreader member extending into said open end of said unidirectional seal element for spreading said lip seal surfaces.

10. The gate valve of claim 1, further comprising:
a second seal ring disposed between said fist seat element and said second seat element.

11. The gate valve of claim 10, wherein:
said second seal ring is sized such that leakage occurs when said telescoping arrangement of said first seat element and said second seat element is expanded.

12. The gate valve of claim 10, further comprising:
a second unidirectional seal element disposed between each recess and each telescoping seat assembly.

13. A gate valve comprising:
a gate valve body having a gate chamber therein, inlet and outlet passages extending through said gate valve body and being in communication with said gate chamber to define a flow path through said gate valve body, said gate valve body having a recess surrounding said inlet and outlet passages adjacent to said gate chamber;
a telescoping seat assembly in each of said recesses, each said telescoping seat assembly including,
  a first seat element defining a receptacle surface therein;
  a second seat element defining an outer surface, said outer surface being telescopingly received within said receptacle surface of said first seat element such that said first seat element and said second seat element are each moveable to said flow path;
  said first seat element and said second seat element defining therebetween a seal cavity between said receptacle surface and said outer surface; and
  a seal element disposed in said seal cavity comprised of material with little or no memory, said seal element having two lip seal surfaces for sealing engagement with said first seat element and said second seat element; and
a gate positioned within said gate chamber, said gate being moveable within said gate chamber between an open position to allow fluid flow through said flow path and a closed position to prevent said fluid flow through said flow path.

14. The gate valve of claim 13, further comprising:
said gate is a floating gate.

15. The gate valve of claim 13, further comprising:
said two lip seal surfaces are comprised of a non-permeable material.

16. The gate valve of claim 13, further comprising:
said seal element being substantially U-shaped or V-shaped, and
a second seal element disposed between said first seat element and said second seat element, said second seal element being substantially U-shaped, said seal element being oriented transversely with respect to said second seal element.

17. The gate valve claim 13, further comprising:
a pair of gate valve body seals disposed between each of said telescoping seat assemblies and respective recesses, each of said pair of gate valve body seals being U-shaped, said gate valve body seals for each pair being oriented in opposite directions.

18. The gate valve claim 13, further comprising,
said seal element being a unidirectional seal element.

19. The gate valve of claim 18, further comprising:
a spring for biasing said lip seals of said seal element, said seal element comprising a unidirectional seal oriented such that a differential pressure across said unidirectional seal with a higher pressure of said differential pressure in said gate chamber as compared to a lower pressure at said open end of said unidirectional seal will cause leakage across said unidirectional valve if said differential pressure is large enough to overcome said bias force of said spring load lip seal surfaces.

20. The gate valve of claim 13, further comprising:
said seal element having an open end and a closed end, and
an anti-extrusion ring adjacent said closed end of said seal element.

21. The gate valve of claim 13, further comprising:
said seal element having an open end and a closed end, and
a spreader member extending into said open end of said seal element for spreading said lip seal surfaces.

22. The gate valve of claim 13, further comprising:
a second seal ring disposed between said first seat element and said second seat element.

23. The gate valve of claim 22, wherein:
said second seal ring is sized such that leakage occurs when said telescoping arrangement of said first seat element and said second seat element is expanded.

24. The gate valve of claim 13, further comprising:
said seal element comprising a first unidirectional seal element, and
a second unidirectional seal element disposed between each recess and each telescoping seat assembly.

25. A method for a gate valve, said gate valve having a gate valve body with a passageway therethrough and a gate chamber therein, providing a pair of recesses along said passageway adjacent said gate chamber; said method comprising:
providing telescoping seat assemblies with first and second interfitting seat components for each of said recesses such that a path exists between said first and second interfitting seat components from said gate chamber to said passageway;
positioning a gate within said gate chamber for opening and closing said valve;
providing a seal cavity between said telescoping seat assemblies along said path; and
providing a U-shaped seal element in said seal cavity, said U-shaped seal element having an open end and a closed end.

26. The method of claim 25, further comprising:
orienting said U-shaped seal element such that said closed end of said seal element is in communication with said gate chamber through said path.

27. The method of claim 25, further comprising:
providing that said gate is a floating gate.

28. The method of claim 25, further comprising:
providing two opposing lip seals on said U-shaped seal element.

29. The method of claim 25, further comprising:
providing that said U-shaped seal element is spring-loaded.

30. The method of claim 25, further comprising:
providing that said U-shaped seal element comprises non-permeable material.

31. The method of claim 25, further comprising:
providing that said U-shaped seal element comprises material with little or no memory.

32. The method of claim 25, further comprising:
spreading said U-shaped seal element by extending a spreader member into said open end of said seal element for spreading said lip seal surfaces.

33. The method of claim 25, further comprising:
providing a second seal ring between said first seat element and said second seat element.

34. The method of claim 33, further comprising:
providing said second seal ring is sized such that leakage occurs when said telescoping arrangement of said first seat element and said second seat element is expanded.

35. The method of claim 25, further comprising:
providing a second U-shaped seal element disposed between each said recess and each said telescoping seat assembly.

36. The method of claim 25, further comprising:
providing an anti-extrusion ring adjacent said closed end of said seal element.

* * * * *